US006274941B1

(12) United States Patent
Ryhiner

(10) Patent No.: US 6,274,941 B1
(45) Date of Patent: *Aug. 14, 2001

(54) PROCESS AND DEVICE FOR DOSING THE THERMAL OUTPUT OF COMBINED HEAT AND POWER GENERATION SYSTEMS

(75) Inventor: Daniel G. Ryhiner, Biel (CH)

(73) Assignee: Ecopower Energy Solutions AG, Biel (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,581
(22) PCT Filed: Jun. 28, 1996
(86) PCT No.: PCT/CH96/00240
§ 371 Date: Feb. 10, 1998
§ 102(e) Date: Feb. 10, 1998
(87) PCT Pub. No.: WO97/02454
PCT Pub. Date: Jan. 23, 1997

(30) Foreign Application Priority Data

Jun. 30, 1995 (CH) .................................................. 1927/95

(51) Int. Cl.[7] .............................. F02N 11/06; H02P 9/04
(52) U.S. Cl. .............................. 290/40 A; 290/7; 290/8; 290/40 B; 290/40 C
(58) Field of Search .................. 290/2, 7, 8, 40 B, 290/40 C, 40 R, 52; 322/34

(56) References Cited

U.S. PATENT DOCUMENTS

| | | | | |
|---|---|---|---|---|
| 4,013,056 | * | 3/1977 | Yamaki et al. | 123/179 |
| 4,262,209 | * | 4/1981 | Berner | 290/7 |
| 4,275,311 | * | 6/1981 | Agazzone et al. | 290/2 |
| 4,340,820 | * | 7/1982 | Meyer-Pittroff et al. | 290/40 R |
| 4,417,194 | * | 11/1983 | Curtiss et al. | 322/47 |
| 4,587,436 | * | 5/1986 | Cronin | 307/21 |
| 4,994,684 | * | 2/1991 | Lauw et al. | 290/52 |
| 5,321,308 | * | 6/1994 | Johncock | 290/40 C |
| 5,352,872 | * | 10/1994 | Tsuji et al. | 219/660 |
| 5,550,410 | * | 8/1996 | Titus | 290/52 |

FOREIGN PATENT DOCUMENTS

| | | | | |
|---|---|---|---|---|
| 3642650 | 7/1988 | (DE) | | F02B/65/00 |
| 4232356 | 3/1994 | (DE) | | H02J/3/01 |
| 0127742 | 12/1984 | (EP) | | H02J/9/08 |
| 0579258 | 1/1994 | (EP) | | F02G/5/04 |

* cited by examiner

Primary Examiner—Elvin Enad
(74) Attorney, Agent, or Firm—Ladas & Parry

(57) ABSTRACT

The thermal output of a combined heat and power generation system is regulated by varying the speed of rotation while maintaining the position of the control means of the thermal engine in its maximum efficiency range. For that purpose, the thermal engine in its full load position or efficiency optimum is brought to a lower or higher speed of rotation exclusively by respectively reducing or increasing the electric current fed into the mains, so that the efficiency of the thermal engine is not substantially affected. The electric current may be maintained at the desired frequency by frequency converters.

5 Claims, 3 Drawing Sheets

US 6,274,941 B1

PROCESS AND DEVICE FOR DOSING THE THERMAL OUTPUT OF COMBINED HEAT AND POWER GENERATION SYSTEMS

BACKGROUND OF THE INVENTION

The process involves the dosing, controlled by speed of rotation, of the thermal output of a combined heat and power generation system, especially a block heating and power station.

Block heating and power stations (BHPS) are relatively small power plants for the production of electric current and heat, the electric current being produced by means of generators driven by heat engines (e.g. reciprocating engines, Wankel engines, Stirling engines or gas turbines). Heat is produced by utilizing the lost heat from cooling water and exhaust gas. This type of energy production is also referred to as combined heat and power (CHP).

On the one hand, previous BHPS were operated with a constant speed of rotation (e.g. 1500 rpm) in order to produce and maintain the required mains frequency (e.g. 50 Hz) via a generator. On the other hand, present-day BHPS are normally operated under full load, i.e. with the throttle fully open, because this maximizes the efficiency for a given speed of rotation.

These two demands for constant speed of rotation and maximum load prevent the present-day plants from being able to be adapted to a change in the heat requirement, e.g. of a connected domestic heating system. It is known that the output of heat engines can only be varied by changing either the speed of rotation or the load. If, for example, an attempt were made to reduce the lost heat output by closing the throttle by a certain amount while maintaining a constant speed of rotation, this measure would only be partially successful. Although the generator output would fall as a function of the throttle position due to the drop in torque on the shaft, the heat emission would only be inadequately reduced because, in a throttled heat engine, the efficiency deteriorates as a result of the throttle losses and the falling average pressure of the heat engine.

Not uncommonly, therefore, BHPS consist of several heat engine generator units and a heating boiler for peak outputs, so that individual units can be switched on or off in order to adjust the power emission of the BHPS as closely as possible to the annual profile (i.e. the cumulative frequency distribution of the thermal output requirement of a consumer unit over a one-year period).

This type of annual profile, such as that illustrated for a particular housing unit in FIG. 4, clearly shows that the thermal output requirement, taken over the year, can be very variable. When planning a BHPS, the annual profile can be used to apportion the capacity to be installed among heat engine generator units and peak load boilers. In FIG. 4, for example, 5 heat engine generator units (M1–M5) are provided for a total of 500% of the maximum output and one conventional heating boiler (hatched area) is provided for the remaining 50% to cover peak outputs, so as to be able to produce the thermal output (Q) of 100% which is required over the year. The rectangles drawn in for the partial outputs indicate the annual work or hours under full load (0–8760 h/a=heating hours per year). It can be seen that the individual engine in FIG. 4 can only cover ca. 10% of the total output. With favourable annual profiles, this percentage can be increased to 15% according to the state of the art.

FIG. 5 illustrates another annual profile for a conventional BHPS with one heat engine generator unit which can produce 30% of the thermal output (Q) (hatched area). For the two non-hatched areas, a conventional heating system must additionally be available in order to supplement the BHPS when the heat requirement is >30% and take over the heat production on its own when the heat requirement is <30% and the BETS is switched off Surprisingly, it has now been found that the dosing of the thermal output, while maintaining the position of the load controls (e.g. throttle) in the region of maximum efficiency of the heat engine, can be effected by changing the speed of rotation of the heat engine or the generator by discharging more or less electric power, preferably into the public supply network.

Accordingly, a combined heat and power generation system operated by means of the process of the invention, especially a BHPS, no longer suffers from the above-mentioned problems because the power output of such a system, even with only one heat engine generator unit, can always be adapted to the annual profile by controlling the heat emission.

This is achieved by a procedure whereby the heat engine is brought to the full load position (open throttle) or optimum efficiency simply by reducing or increasing the speed of rotation to a lower or higher level by changing the discharge of electricity, e.g. into the public supply network.

If the generator is forced via a current regulator to discharge more electricity into the public supply network, its load increases and the heat engine generator unit is thus slowed down to a lower speed of rotation. This is how the output can be adjusted to any desired level while always keeping the throttle open. Current regulation corresponds to the usual method by which a voltage increase above the level of mains voltage also results in an increased current flow.

The dosing of the heat emission of a BHPS under full load can thus be effected by loading of the generator with the mains supply and consequent regulation of the speed of rotation.

Because changes in speed of rotation of the engine also change the frequency of the electric current it produces, which is undesirable as the consumer requires a uniform alternating current frequency of 50 Hz, the electric current can be kept at the mains frequency e.g. by conventional AC/DC/AC transformation using a frequency converter.

The process according to the invention and a device for carrying it out are illustrated in greater detail below.

BRIEF DESCRIPTION OF THE SEVERAL VIEWS OF THE DRAWINGS

FIG. 1 shows the central heating (1) and the BHPS (2). The BHPS (2) comprises a combustion engine (3) and a 0–370 V/0–1500 Hz generator (4). To be able to supply electric power of constant frequency to the house connection or the public supply network (50 Hz), a rectifier (5), a±370 V DC step-up trrnsformer (6) and a 3×400 V AC/50 Hz inverter with combined current regulator (7) are built into the BHPS. The electric power is then discharged at 3×400 V AC into the public supply network (8a–c). A temperature difference sensor (11), for example, is fitted to the in-flow pipe (9) and out-flow pipe (10) of the central heating (1) and feeds the heat requirement of the heating system to the control (12). The thermal output is adapted e.g. by maintaining a set temperature difference. Alternatively, the required thermal output can also be set by an external temperature sensor (13). The (control (12) determines the engine output to be delivered by the BHPS and regulates the current flow via the inverter (7) into the supply network (8a–c), thereby loading (=slowing down) the generator (4) to a greater or lesser extent and hence levelling out the speed of rotation and therefore also the engine output to the values set by the heating system. The throttle (14) is kept constantly open by the control device in this process. 8d–f denotes the tap for supply network monitoring and synchronization. The cooled water from the central heating (1) is carried through the out-flow (10) into the heat exchanger (15), where it absorbs heat again and returns to the central heating (1) via the heating in-flow (9).

Figure 2A:
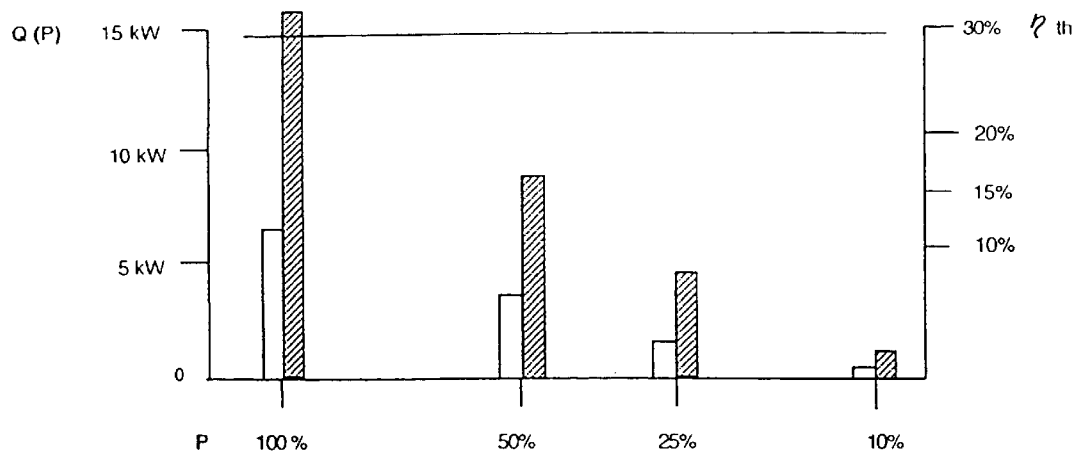
FIG. 2a shows the generator output and heat production with the heat regulation according to the invention and FIG. 2b show them with the conventional regulation, i.e. with a constant speed of rotation of the generator.

The relationship between generator output and heat production (0–15 kW) shown in FIG. 2a is obtained by means of the process according to the invention and the device required for carrying it out Here the BHPS is operated with variable speed of rotation under full load, the engine output (P) being adjusted to 100%, 50%, 25% and 10%. The thermal output (Q) in kW, shown by hatched bars, drops proportionately to the generator output (P) in kW, shown by non-hatched bars. The thermal output can be varied within wide limits, although the efficiency η of the engine remains at ca. 30% (horizontal line).

Figure 2B:
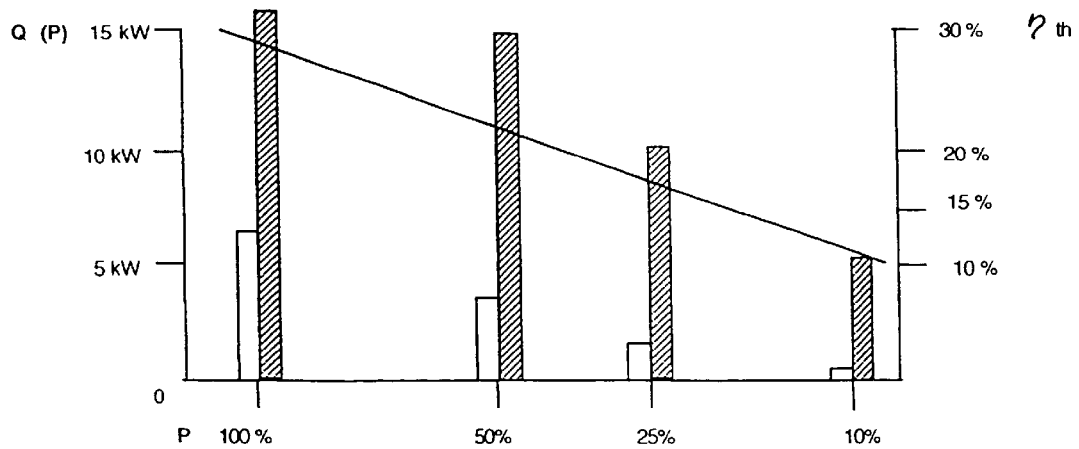
Figure 4:
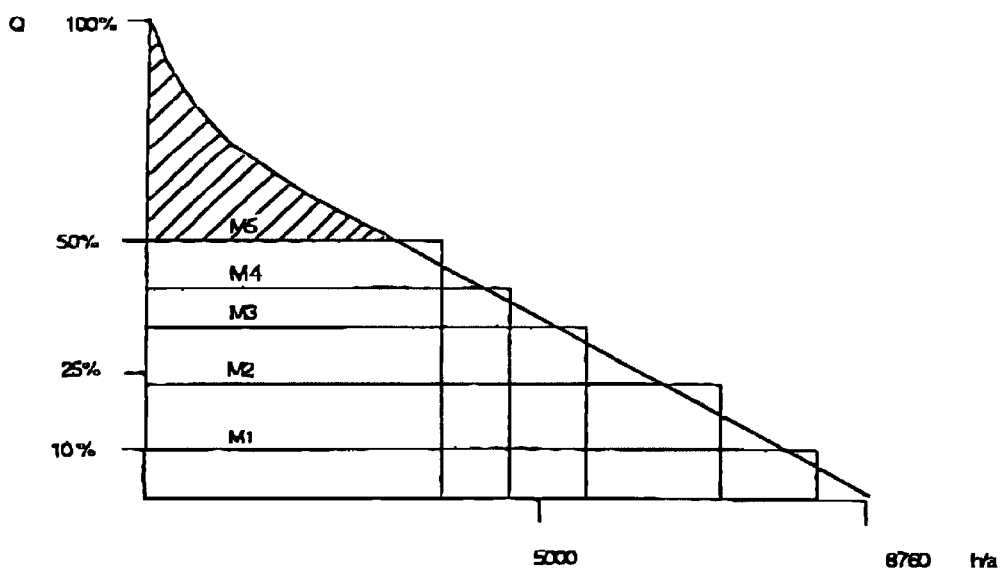
FIG. 4 shows the covering of the heat requirement by 5 heat engine generator units providing 50% of the maximum output and one conventional heating system providing the remaining 50%.
Figure 5:
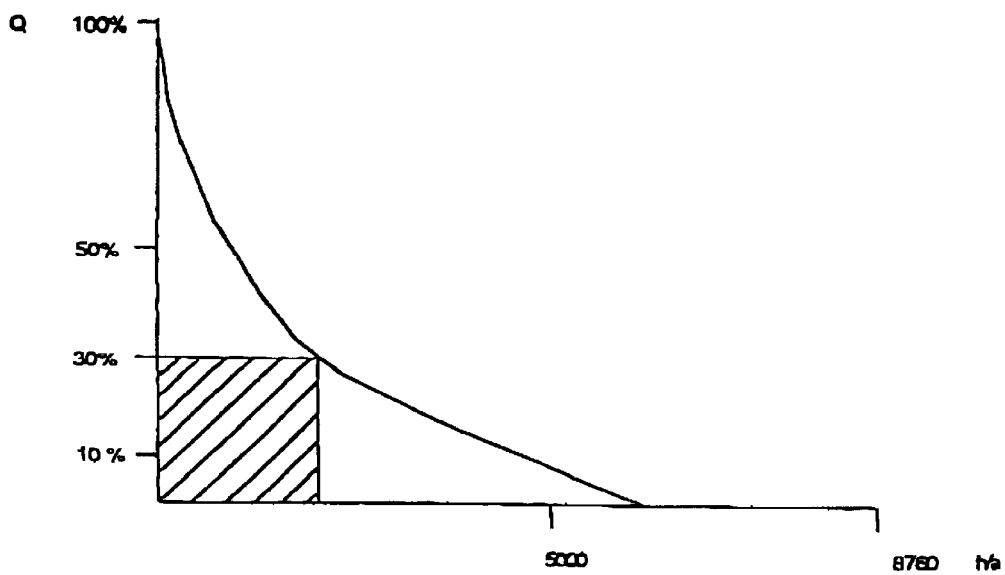
FIG. 5 shows the covering of the heat requirement by a single heat engine generator unit providing 30% of the maximum output and one conventional heating system providing the remaining 70%.

For the purpose of comparison, conventional regulation with a constant speed of rotation of the generator is shown by analogy in FIG. 2b. Here the output is adapted via the throttling of the engine at a constant speed of rotation. Again the generator output (P) in kW, shown by non-hatched bars, drops, but the engine efficiency η decreases at the same time (sloping line). This is why the thermal output (Q) in kW, shown by hatched bars, only decreases slightly. The thermal output can only be varied within narrow limits.

Figure 1:
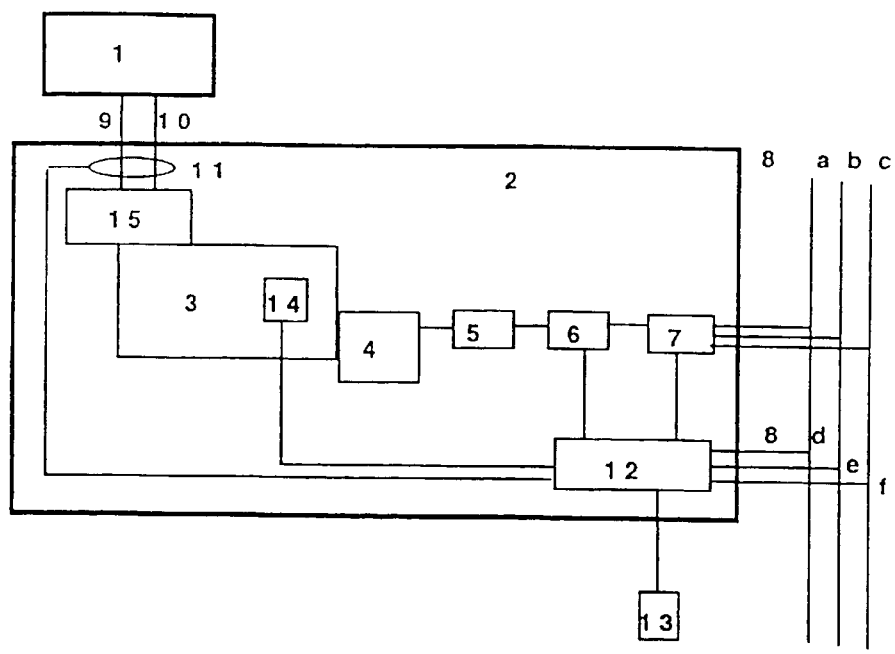
FIG. 1 shows the basic diagram of a BHPS, e.g. for a detached family house.
Figure 3:
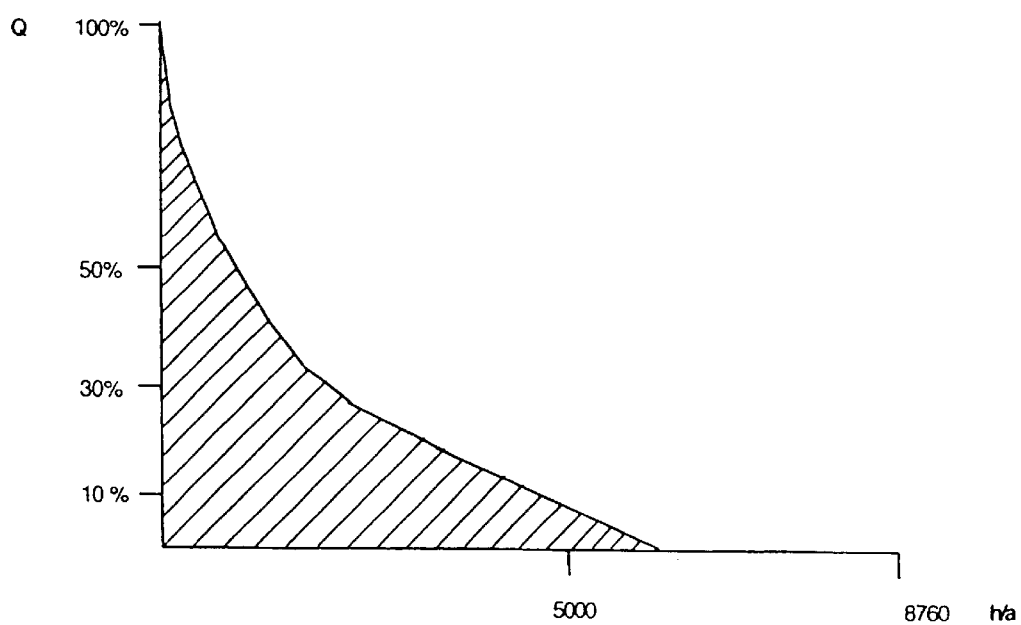
FIG. 3 shows the covering of the heat requirement, e.g. of a detached family house, with a BHPS regulated according to the invention.

FIG. 3 shows that, through the easily and widely variable thermal output (0–100%) (Q) of a BHPS operated by the process according to the invention, the entire heat requirement of a house over the annual profile (0–8760 h/a) can be covered by means of a single engine generator unit (hatched area).

What is claimed is:

1. A method for controlling a thermal output of a combined heat and power generation system having an internal combustion engine coupled to an electrical generator and load control means, the generator being electrically connected to en external net via an AC/DC/AC transformation by means of a frequency converter, the method comprising the steps of maintaining a throttle of the internal combustion engine in an essentially open position, and;

controlling the amount of electric power discharged to the external net so as to vary the speed of rotation of the internal combustion engine in order to achieve a desired thermal output of the generation system.

2. The process according to claim 1, wherein the electric power is kept at a constant frequency by means of AC/DC/AC transformation using a frequency converter.

3. The process according to one of claim 1 or 2, wherein the thermal output is controlled with a single engine generator unit approximately over a given annual profile of a system user.

4. The process of claim 1 wherein the process is applied to block heating and power stations (=BHPS).

5. A block heating and power station for carrying out the process according to claim 1, comprising a heat engine (3), a generator (4), a rectifier (5), a step-up transformer (6), an inverter with combined current regulator (7), and controls (12).

* * * * *